May 13, 1952 — P. W. RANBY — 2,596,509
TITANIUM ACTIVATED BARIUM PYROPHOSPHATIC PHOSPHOR
Filed April 10, 1951

INVENTOR:
Peter Whitten Ranby
By Laurence Burns,
Attorney.

Patented May 13, 1952

2,596,509

UNITED STATES PATENT OFFICE 2,596,509

TITANIUM ACTIVATED BARIUM PYROPHOSPHATE PHOSPHOR

Peter Whitten Ranby, London, England, assignor to Thorn Electrical Industries Limited, London, England, a company of Great Britain Application April 10, 1951, Serial No. 220,177
In Great Britain July 17, 1950

8 Claims. (Cl. 252—301.4)

This invention relates to phosphate phosphors for use as luminescent materials in fluorescent electric discharge lamps, cathode ray tubes, X-ray screens and the like.

I have found that a barium phosphate containing titanium is an especially effective phosphor for such devices, and particularly for fluorescent lamps, where it responds to the 2537 Angstrom unit wavelength of mercury radiation.

This phosphor has one of the broadest emission bands known, and gives a bright bluish-white or greenish-white light when excited.

My phosphor approximates barium pyrophosphate in composition, but can contain an excess of barium oxide up to 25% by weight, or of phosphorus pentoxide up to 5% by weight, above the stoichiometric proportion of the equivalent barium oxide and phosphorus pentoxide components of barium pyrophosphate.

The proportions of titanium present in the starting mixture may vary widely, fluorescence being obtained from about 0.05 per cent to about 50 per cent by weight of titanium, taken as the metal, in the barium phosphate matrix of the phosphor. About 1% to 20% of titanium, taken as the metal, is a more preferred range, however, and taken in terms of the percentage of titanium dioxide with respect to the amount of secondary barium phosphate used as a starting material in making the phosphor, about 8% to 16% is the range over which the luminescent intensity remains at a fairly flat maximum. Within this range itself, there is a slight maximum at about 9%, which corresponds to a composition having the formula $2Ba_2P_2O_7 \cdot (1TiO_2)$ in the fired phosphor.

The luminescent material is made by heating to a temperature above 800° C. and preferably between 850° C. and 1200° C. The relative intensity, or brightness, of the phosphor has a sharp maximum at a firing temperature slightly above 1000° C., that is between about 1000° C. and 1075° C. and in the neighborhood of 1030° C.

Figure 1:
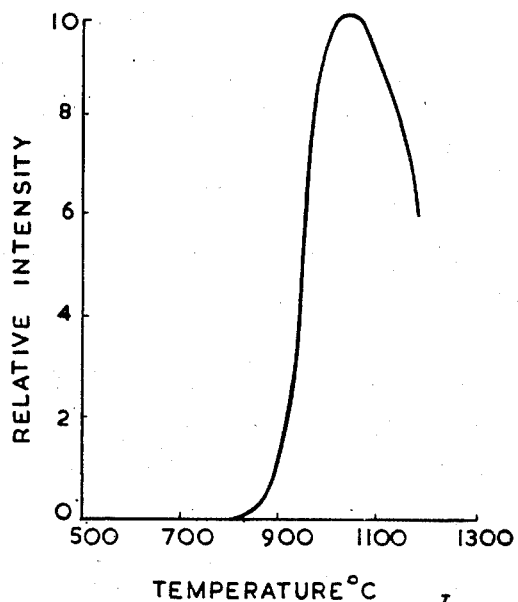

Fig. 1 is a plot of the phosphor's relative luminescent intensity against firing temperature, and shows the maximum, to which reference has been made.

Figure 2:
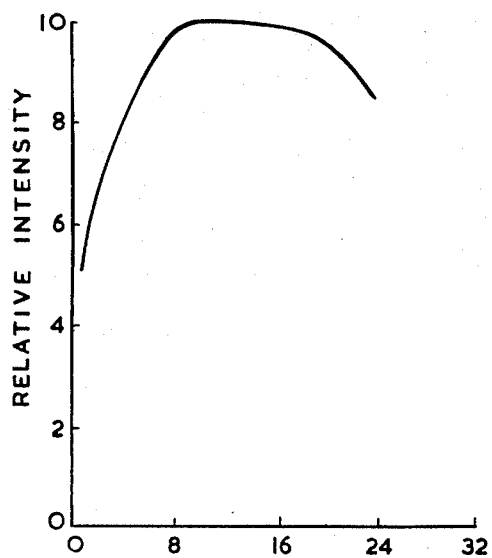

Fig. 2 is a plot of the phosphor's relative luminescent intensity against per cent by weight of titanium dioxide, the weight being taken in terms of the weight of equivalent barium hydrogen phosphate, often called secondary barium phosphate or di-basic barium phosphate, as a starting material. The plot is for a firing temperature of about 1030° C. The 2537 Angstrom unit mercury radiation was used for excitation of the phosphor.

As an example of a phosphor prepared as one embodiment of the invention, 260 grams of barium nitrate are dissolved in 1½ litres of hot distilled water. The solution is purified by the addition of a few drops of ammonium sulphide solution and any precipitate obtained is filtered off and discarded. The hot filtrate is stirred into a hot solution of diammonium hydrogen phosphate containing 130 grams of diammonium hydrogen phosphate dissolved in 1 litre of distilled water. The resultant precipitate of barium phosphate is filtered off and washed with hot distilled water and then dried. 10 grams of this dried barium phosphate precipitate are ground with 1.2 gram of titanium dioxide and the mixture is then heated in air for half an hour at 1050° C. When cool the product can be ground and reheated for half an hour at 1050° C. Owing to slight variations in the composition of the barium phosphate precipitate, it is sometimes advantageous to increase the concentration of barium oxide or phosphorus pentoxide in the mixture before heating, by adding a small proportion of a barium compound such as barium carbonate, nitrate or oxalate, or an ammonium phosphate such as diammonium hydrogen phosphate respectively.

As a second example, 260 grams of barium nitrate are dissolved in 1½ litres of hot distilled water and the solution is purified as described in the previous example. The hot filtrate is stirred into a hot solution of diammonium hydrogen phosphate containing 172 grams of diammonium hydrogen phosphate dissolved in 1 litre of distilled water. To this mixture is then added 98 grams of potassium titanium oxalate dissolved in 1 litre of distilled water. The precipitate is filtered off, thoroughly washed with hot distilled water, and dried. The dried precipitate is heated for half an hour at 150° C., and when cool may be ground and reheated for half an hour at 1050° C.

In still another example, 8.8 grams of barium carbonate and 1 gram of titanium dioxide are ground with either 5.9 grams of diammonium hydrogen phosphate or 5.2 grams of ammonium di-hydrogen phosphate. The mixture is heated for half an hour at 1050° C., and may be ground and reheated for half an hour at 1050° C. Sometimes a more brightly luminescent material is obtained if a small proportion of a flux, for example, barium fluoride is added before heating.

Accordingly, the preceding example can be modified by incorporating 0.2 gram of barium fluoride before heating for the first time.

As is customary in phosphor preparation, the materials used in the firing should be quite pure. Barium titanium phosphate is more susceptible to copper impurities, and somewhat less susceptible to iron impurities, than certain other phosphors. But both these and other of the usual impurities deleterious to phosphors should be avoided, or kept below about 0.002% by weight of the phosphor, for maximum luminescence.

The amount of titanium present in the phosphor described herein is of such a magnitude that it does not appear to be an activator of the "impurity type," present in small amounts, and the resulting compound has luminescent properties more like that of the so-called "pure compound" or "unactivated" phosphors such as magnesium tungstate. The luminescence may be due to a complex titano-phosphate ion, rather than to the titanium "activator" alone, although X-ray diagrams of the phosphor indicate chiefly a barium pyrophosphate structure. However, for convenience, the titanium is described in some of the appended claims as an "activator" because the sense in which the term is used is quite clear. It there means simply that the presence of titanium is necessary for luminescence of the phosphor.

The barium titanium phosphate phosphor gives a blue-white or green-white color, having one of the widest emission bands known, extending from the ultraviolet to the red, with a peak at about 500 millimicrons wavelength. For this reason, it is especially effective in fluorescent lamps, used either alone or in mixtures with other phosphors. The pronounced red emission is of assistance in providing lamps with better color rendering at the red end of the spectrum than is normally obtained. The phosphor maintains its brightness exceptionally well throughout the life of such lamps.

The phosphor is excited by cathode rays, X-rays, and short wavelength ultraviolet such as the mercury 2537 Angstrom unit radiation, but the longer wavelength ultraviolet such as the mercury 366 millimicron radiation is not very effective for excitation.

The titanium may be added in the form of a titanium compound such as the dioxide, phosphate or titanate, or of materials which form such compound on heating.

Instead of using barium hydrogen phosphate as a starting material for firing, previously prepared barium pyrophosphate can be used, with an added barium fluoride flux, if desired. But if the pyrophosphate has been previously altered by being preheated with barium fluoride, say 2% by weight, it will give poor fluorescence when subsequently heated with titanium dioxide.

Instead of barium phosphate, ingredients which will yield the phosphate on firing may be used. Among these are: barium oxide, or a barium compound which will yield barium oxide on heating, and an ammonium phosphate; barium phosphate and barium oxide or a barium compound which will yield barium oxide; or barium phosphate, barium oxide or a barium compound which will yield barium oxide on heating, and an ammonium phosphate.

The firing of the phosphor can be done in air or in any other suitable atmosphere.

What I claim is:

1. A titanium-activated barium pyrophosphate phosphor, the titanium being present in an amount between about 0.05 per cent to about 50 per cent by weight of titanium, taken as metal, in the barium phosphate.

2. A titanium-activated barium pyrophosphate phosphor, having an excess of equivalent barium oxide not greater than 25% by weight over the stoichiometric proportions, the titanium being present in an amount between about 0.05 per cent to about 50 per cent by weight of titanium, taken as metal, in the barium phosphate.

3. A titanium-activated barium pyrophosphate phosphor having an excess of equivalent phosphorus pentoxide not greater than 5% over the stoichiometric proportions, the titanium being present in an amount between about 0.05 per cent to about 50 per cent by weight of titanium, taken as metal, in the barium phosphate.

4. A titanium-activated barium pyrophosphate phosphor having its equivalent barium oxide content between a deficiency of 5% and an excess of 25% from its stoichiometric proportion by weight, the titanium being present in an amount between about 0.05 per cent to about 50 per cent by weight of titanium, taken as metal, in the barium phosphate.

5. A barium titanium pyrophosphate phosphor containing between about 8% and 16%, by weight of titanium dioxide, the weight being taken in percentage of the equivalent secondary barium phosphate, the equivalent barium oxide content of the phosphor being between a deficiency of 5% and an excess of 25% from its stoichiometric proportion by weight.

6. A barium titanium phosphate phosphor having the approximate proportions of $$2Ba_2P_2O_7 \cdot (1TiO_2)$$

7. The method of preparing barium titanium pyrophosphate phosphor, having an equivalent barium oxide content between a deficiency of 5% and an excess of 25%, from the stoichiometric pyrophosphate proportion by weight, and having about 0.05% to about 50% by weight of titanium, taken as metal in the equivalent percentage of barium phosphate, said method comprising: mixing as fine powders the ingredients necessary to form a phosphor of said composition and proportions, and then firing the mixture at a temperature in the neighborhood of 1000° C.

8. The method of claim 7 in which a barium fluoride flux is added to the mixture before firing.

PETER WHITTEN RANBY.

REFERENCES CITED

The following references are of record in the file of this patent:

UNITED STATES PATENTS

| Number | Name | Date |
| --- | --- | --- |
| 2,270,124 | Huniger | Jan. 13, 1942 |
| 2,473,960 | Kroger | June 21, 1949 |